Feb. 26, 1935.     R. E. MATHES     1,992,625
FREQUENCY CONTROLLING SYSTEM
Filed Sept. 29, 1933    2 Sheets-Sheet 1

INVENTOR
RICHARD E. MATHES
BY
ATTORNEY

Feb. 26, 1935.  R. E. MATHES  1,992,625
FREQUENCY CONTROLLING SYSTEM
Filed Sept. 29, 1933  2 Sheets-Sheet 2

INVENTOR
RICHARD E. MATHES
BY
ATTORNEY

Patented Feb. 26, 1935

1,992,625

UNITED STATES PATENT OFFICE 1,992,625

FREQUENCY CONTROLLING SYSTEM

Richard E. Mathes, Westfield, N. J., assignor to Radio Corporation of America, a corporation of Delaware Application September 29, 1933, Serial No. 691,447

6 Claims. (Cl. 172—246)

In many systems, such as apparatus for facsimile transmission, it is essential to supply synchronous motors with waves of very constant frequency. As far as I am aware, it has heretofore been proposed to maintain a separate temperature controlled source for supplying each synchronously operated motor. Clearly, where many motors are involved the energy sources therefor become costly both as to initial expenditure and as to subsequent upkeep. To eliminate this objectionable feature in the art is the principal object of my present invention.

A more detailed object of my present invention is to provide an arrangement wherein a commercial supply source such as the standard 60 cycle 110 volt supply may be made to provide large amounts of power at substantially constant frequency despite variations in frequency at the power house. In achieving this object I use a wound rotor type of alternating current motor as a transformer, the rotor winding being used to supply output energy. In order to maintain the output energy constant in frequency or effectively constant in phase regardless of phase variations in the waves applied to the stator, I provide an arrangement, which uses merely a single accurately maintained standard frequency source, for automatically shifting the position of the rotor relative to the stator in such a way that the phase, and hence the frequency of the output from the rotor winding, stays constant.

Figure 1:
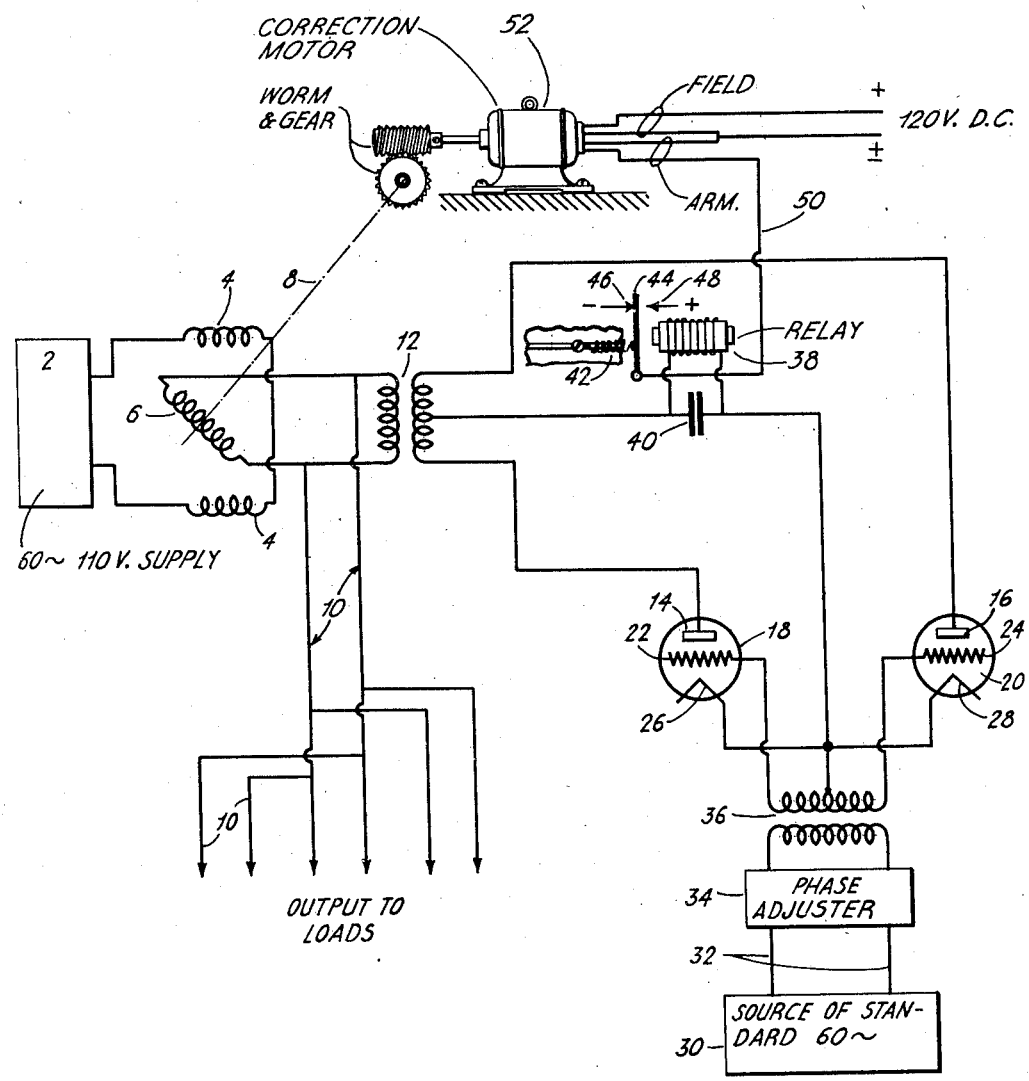
Figure 2:
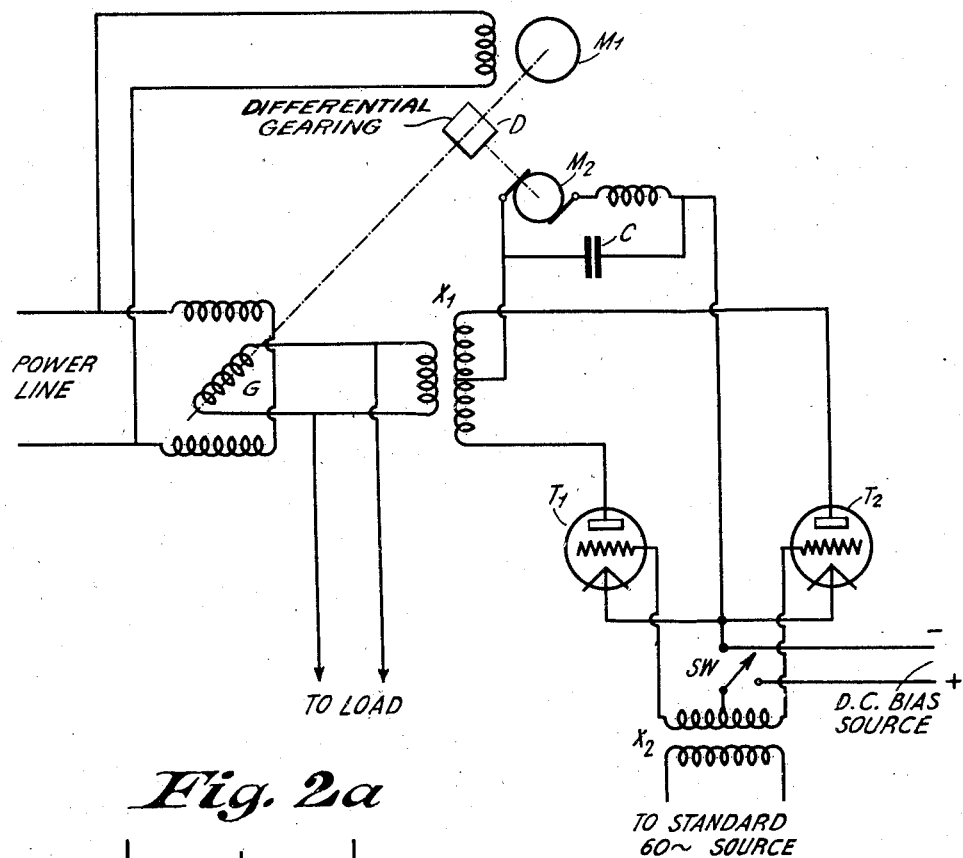
Figure 2A:
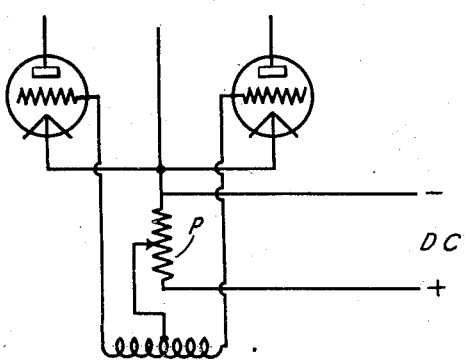

My present invention is described in greater detail with the aid of the accompanying drawings wherein, Figures 1, 2 and 2a are schematic wiring diagrams of preferred forms of my present invention.

Turning to Figure 1, energy or waves from a controllable wave source 2, which may be a commercial 60 cycle 110 volt supply, are fed to the stator windings 4 of a single phase wound rotor alternating current type of motor. This motor has the wound rotor 6 and a shaft diagrammatically illustrated at 8. If desired the alternating current motor may be of the type having a polyphase stator and a single phase rotor. Through leads 10 output energy is taken from the rotor winding 6 and fed to several load circuits not shown, such as synchronous motors.

In order to maintain the controllable waves fed through leads 10 at a constant frequency, the rotor 6, with changes in frequency or effective changes in phase of waves from source 2, is reversed in direction and/or in amount of rotation. That is to say, since the location of the rotor relative to the stator determines the phase of output in leads 10, I have provided means, which shall be described more fully hereinafter, for automatically shifting the position of the rotor winding so that the relative phase and hence frequency of the waves in the leads 10 shall remain substantially constant.

More fully, a portion of the rotor wave energy is fed through transformer 12 to the like cold electrodes, plates or anodes 14, 16 of the vapor electric discharge devices 18, 20, which have in addition other like cold electrodes or controlling grids 22, 24 and the cathodes 26, 28. The grids 22, 24 are fed with waves from a standard source of controlling waves 30 which may be a temperature controlled tuning fork tube oscillator, or for example, a pair of temperature controlled piezoelectric oscillators beat together so as to supply in leads 32 controlling waves of a desired constant frequency. By means of phase adjuster 34 and transformer 36 waves from the controlling source 30 are fed in predetermined phase relation to the grids 22, 24 with respect to the controllable waves fed to the anodes 14, 16. Preferably the phase displacement of the waves applied to the plates 14, 16 and the waves applied to the grids 22, 24, is made 90 degrees when the waves in the leads 10 are in synchronism with waves from the source 30.

The vapor electric devices 18, 20 sold under the trade-mark "Thyratron", have the characteristic that while they are rendered conductive by the application of a suitable potential to the grid or control electrodes only a reduction in the plate voltage can cause subsequent extinguishment thereof. In other words, once an arc has been started by the voltage impressed upon the grid of said device, the grid is no longer effective in controlling the current flow through the tube.

With this operation in mind it will appear that at synchronism a certain mean current will flow through the relay coil 38, which, for smoothing out ripple and for eliminating short time fluctuations, is shunted by a suitable condenser 40. With means current flowing through the relay coil 38, spring 42 is adjusted so that the switch or armature tongue 44 does not rest upon either potential contact 46 or 48 but assumes some intermediate non-contacting position.

In the event that the phase of energy in the leads 10, and hence in the transformer 12, shifts with respect to waves from the controlling source 30, there will be obviously either an increase or decrease of current flow through the relay 38. With increased current, contact 44 will be moved to the right impressing a relatively positive potential upon the armature lead 50 of the reversible correction motor 52 causing the shaft 8 to be driven through the worm and gear mechanism 54 in such a direction as to bring the phase of the energy in the leads 10 and in the transformer 12 back to the initial setting, and hence bring the waves in leads 10 into synchronism with waves from the controlling source 30.

In the event that the phase of the waves in the wound rotor 6 or controllable source shift oppositely in phase, there will be a relative decrease in current through the relay coil 38 as a result of which a negative potential will be impressed upon the armature lead 50 causing a relative reversed rotation of shaft 8 until the waves engendered in rotor 6 are again in synchronism with waves from the standard source 30.

The arrangement shown in Figure 2 operates the same as that illustrated in Figure 1 in all of its essentials. However, the means provided for actuating the rotor of the frequency changer is different. In the system of Figure 2, the rotor G is driven by an auxiliary 60 cycle motor $M_1$ operating through a differential gearing D and properly geared to the rotor G. The gearing is so chosen that rotor G will be rotated fast, say, by an amount equal to the maximum drift of the power line frequency below the frequency of the standard 60 cycle source. A second auxiliary motor $M_2$ which is a D. C. series wound type of prime mover, acts upon the other portion of the differential gearing D. The ratios are so chosen that when motor $M_2$ is operating at full speed, rotor G will be driven slowly, that is to say, in reverse direction and by a speed equal to its highest speed due to motor $M_1$, when motor $M_2$ is stationary.

Motor $M_2$ is connected as illustrated in the return lead from the exciting transformer $X_1$ of the tubes $T_1$, $T_2$ corresponding to tubes 18, 20 of Figure 1. This motor, namely, motor $M_2$ will operate at a speed dependent upon the average current through the tubes $T_1$ $T_2$ which in turn is determined by the phase relation between the waves from the standard source and the waves fed into the secondary of transformer $X_1$ as explained in connection with the system shown in Figure 1.

Also, in the system shown in Figure 2, a switch SW in the common grid lead and associated with a D. C. biasing source, is provided. It will be found advantageous when starting the system in operation, to throw the switch to the positive terminal thus biasing the grid sufficiently positive to maintain them above striking potential during the entire cycle of the standard source, thus causing motor $M_2$ to run at full speed until approximately the desired phase relation obtains between rotor G and the standard source, at which time switch SW is thrown back to its upper normal position at which the grids are connected more directly to the cathodes of the tubes as shown.

Figure 2a shows another scheme for this purpose but instead of a switch makes use of a potentiometer P which will serve to give smoother action and closer control of the manual adjustment at starting. Obviously, other means of manually controlling motor $M_2$ may be used. For example, when starting, motor $M_2$ may be driven from a direct current source and then switched into the tube circuit when the desired phase relation between the standard and load takes place.

Having thus described my invention, what I claim is:

1. In a system for varying a controllable wave in accordance with a controlling wave, an alternating current motor having a stator winding and a wound rotor, means for supplying alternating current energy to the stator winding of said motor, a reversible driving means mechanically coupled to said rotor, a load circuit coupled to the winding on said rotor, a source of controlling waves, and means responsive to changes in phase between waves induced in said wound rotor and waves from said controlling source for changing the amount and direction and speed of rotation of said driving means and consequently said rotor whereby the waves induced in said rotor closely follow the waves from said controlling wave source.

2. A system as defined in claim 1 characterized by the fact that said means responsive to changes in phase between waves from said means supplying alternating current energy to said stator and waves from said controlling source comprise a plurality of multi-electrode devices each of which have a plurality of cold electrodes, and being further characterized by the fact that means are provided for applying waves from said controlling source to like cold electrodes of said devices and also by the fact that means are provided for applying waves from the winding of said rotor to other like cold electrodes of said devices.

3. A frequency correcting system comprising a source of alternating current subject to frequency variations, a transformer system having relatively movable windings, a load circuit coupled to said windings, another source of alternating current of a much higher order of frequency stability than said first mentioned source, and means responsive to the phase relation between the output of said transformer system and energy from said second mentioned source of alternating current to adjust the relative physical positions of said windings.

4. Apparatus as claimed in claim 1 characterized by the fact that said phase change responsive means comprises a pair of discharge devices each having an anode a cathode and a control grid, and being further characterized by the fact that waves from said controlling source are applied to said controlling grids and that waves from the winding of said rotor are applied to the anodes of said devices.

5. In combination, an alternating current motor having stator and rotor windings, means for applying alternating currents to said stator windings, a load circuit coupled to said rotor winding, a pair of vapor electric devices each having an anode a cathode and a grid, a source of controlling waves, means for applying waves from said rotor winding to the anodes of said devices, means for applying waves from said controlling wave source to the grids of said vapor electric devices, said waves being applied to the electrodes of said devices at a predetermined phase displacement, and means, responsive to variations in current flow through said devices upon relative changes in phase of waves in said rotor winding and waves in said controlling source for changing the direction and amount and speed of rotation of said rotor winding relative to said stator winding.

6. In a system for maintaining a wave, which may vary as to phase or frequency, substantially constant as to phase and frequency comprising, an alternating current motor having a stator winding and a movable winding coupled to said stator winding, circuits for supplying energy the phase and frequency of which is to be controlled to the stator winding of said motor, driving means coupled to said movable winding, a utilization circuit coupled to said movable winding from which the controlled energy may be utilized, a source of controlling waves of substantially fixed frequency, and means responsive to changes in phase between waves induced from said stator winding into said movable winding and waves from said source of controlling waves for controlling the action of said driving means.

RICHARD E. MATHES.